(12) United States Patent
Conrad

(10) Patent No.: US 6,251,172 B1
(45) Date of Patent: Jun. 26, 2001

(54) PORTABLE WATER RECOVERY AND DISPENSING APPARATUS

(75) Inventor: Wayne Ernest Conrad, Hampton (CA)

(73) Assignee: Fantom Technologies Inc., Welland (CA)

( * ) Notice: Subject to any disclaimer, the term of this patent is extended or adjusted under 35 U.S.C. 154(b) by 0 days.

(21) Appl. No.: 09/353,157

(22) Filed: Jul. 14, 1999

(51) Int. Cl.$^7$ .............. B01D 53/04; B01D 29/00
(52) U.S. Cl. .............. 96/122; 96/128; 96/136; 96/142; 96/223
(58) Field of Search .......... 95/114–126; 96/108, 96/121–128, 134–136, 142, 223, 224, 118–120; 210/760, 764

(56) References Cited

U.S. PATENT DOCUMENTS

| | | | |
|---|---|---|---|
| 2,138,687 | * 11/1938 | Altenkirch | 95/122 X |
| 2,138,689 | * 11/1938 | Altenkirch | 95/115 |
| 3,400,515 | * 9/1968 | Ackerman | 96/126 X |
| 4,146,372 | * 3/1979 | Groth et al. | 95/124 |
| 4,185,969 | * 1/1980 | Bulang | 95/120 |
| 4,219,341 | * 8/1980 | Hussmann | 96/127 |
| 4,285,702 | * 8/1981 | Michel et al. | 95/124 |
| 4,299,599 | * 11/1981 | Takeyama et al. | 96/122 |
| 4,304,577 | * 12/1981 | Ito et al. | 96/127 |
| 4,342,569 | * 8/1982 | Hussmann | 95/124 |
| 4,724,079 | * 2/1988 | Sale et al. | 210/764 X |
| 4,726,817 | * 2/1988 | Roger | 95/115 |
| 4,762,613 | * 8/1988 | Snowball | 210/764 X |
| 4,861,489 | * 8/1989 | Swift et al. | 210/764 X |
| 5,015,394 | * 5/1991 | McEllhenney et al. | 210/764 X |
| 5,846,296 | * 12/1998 | Krumsvik | 95/117 X |

FOREIGN PATENT DOCUMENTS

| | | | |
|---|---|---|---|
| 2702 701 | * 7/1978 | (DE) | 95/124 |
| 3208 964 | * 9/1983 | (DE) | 95/117 |
| 4300 001 | * 7/1994 | (DE) | 95/117 |
| 56-102923 | * 8/1981 | (JP) | 95/124 |
| 56-102924 | * 8/1981 | (JP) | 95/124 |
| 56-102925 | * 8/1981 | (JP) | 95/124 |
| 56-105724 | * 8/1981 | (JP) | 95/121 |
| 61-178015 | * 8/1986 | (JP) | 95/124 |
| 63-001418 | * 1/1988 | (JP) | 95/126 |
| 63-093938 | * 4/1988 | (JP) | 95/126 |

OTHER PUBLICATIONS

The Water Machine, An Atmospheric Water Maker, International Water Machines, Inc. (undated).

* cited by examiner

Primary Examiner—Robert H. Spitzer
(74) Attorney, Agent, or Firm—Philip C. Mendes da Costa; Bereskin & Parr

(57) ABSTRACT

A water dispenser has an apparatus for removing water from the air and an apparatus for treating the water to provide a consumer with potable water.

11 Claims, 1 Drawing Sheet

PORTABLE WATER RECOVERY AND DISPENSING APPARATUS

FIELD OF THE INVENTION

This invention relates to a method and apparatus for producing water from the air and for treating the water to obtain potable water.

BACKGROUND OF THE INVENTION

While municipal water is available in various locations, concerns have been raised recently regarding the quality of municipal water. For example, it has been known for municipal water to become contaminated after it has left a treatment plant prior to its delivery to a consumer.

In view of these concerns, recently consumers have commenced purchasing bottled water. One disadvantage of this approach is that the consumer does not have any control over the quality of the bottled water. Further, if a consumer goes through a substantial amount of bottled water, then, to avoid frequent purchases, substantial storage space is required to store the bottled water.

In particular, consumers have purchased water coolers wherein a jug of water is connected to a cooling and dispensing unit (typically on the order of five gallon jugs). These jugs are cumbersome to store. Further, they are awkward to manage in that the jug must typically be inverted in order to connect it in a flow communication with the dispenser.

In offices, water coolers have been provided wherein the cooler is connected to the plumbing of the building. While these provide a continual source of water, they are difficult to install as they must be connected to the water supply for the building.

SUMMARY OF THE INVENTION

In accordance with the instant invention, there is provided a portable unit which may provide potable water. The unit may be located indoors or outdoors. For example, the unit may be provided as an individual unit within an office. The unit is connected to a source of power (it may be plugged in to an electrical outlet). The unit obtains water from the air and therefore the unit operates independently of the water supply to the building. It will be further appreciated that the unit may be provided outdoors at any location where power may be provided.

The unit operates by extracting water from the air. Various processes for obtaining water from the air are known. For example, water may be condensed from the air by means of a desiccant or by contacting the air with a chilled surface. The recovered water may then be filtered and purified. The water is stored in a reservoir and subsequently dispensed on demand by a user.

In accordance with this invention, the water in the reservoir may be occasionally treated to ensure that the water remains potable. Further, the water may be passed through a filter member or the like to add minerals to the water to improve the taste of the water.

DESCRIPTION OF THE DRAWINGS

These and other advantages of the instant invention will be more fully and particularly understood in connection with the following description of a preferred embodiment of the invention in which.

DESCRIPTION OF THE PREFERRED EMBODIMENT

Figure 1:
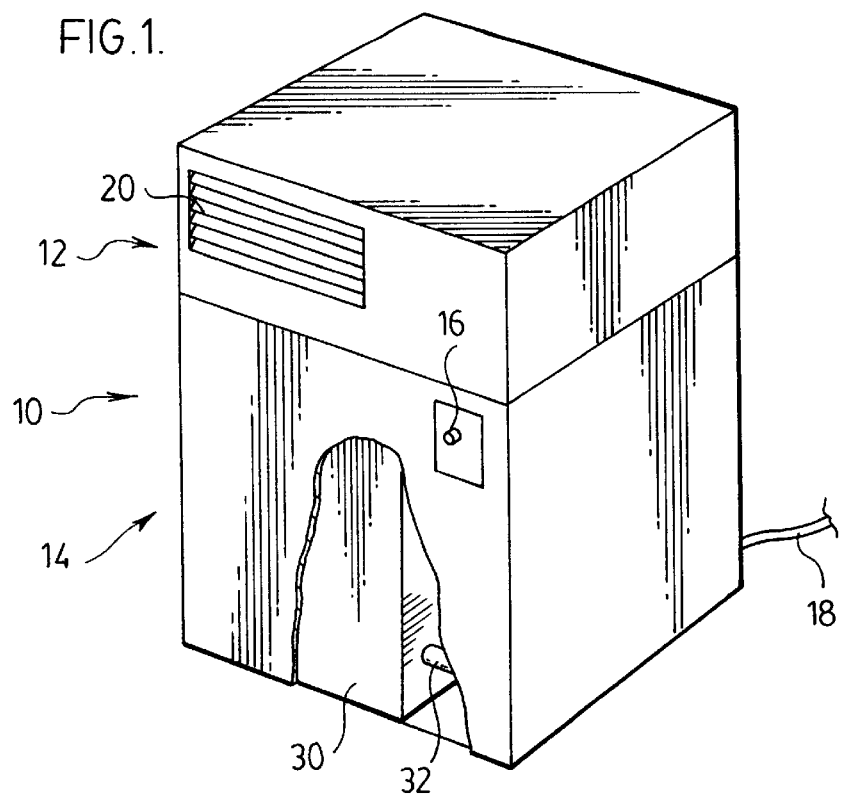
FIG. 1 is a perspective view of an apparatus according to the instant invention; and, FIG. 2 is a schematic diagram of the operation of the apparatus of FIG. 1.
Figure 2:
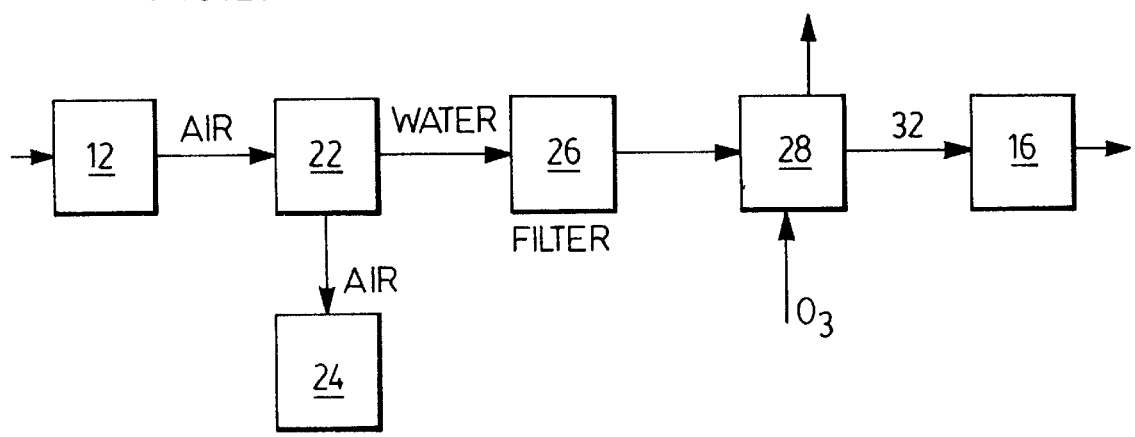

Referring to FIG. 1, apparatus 10 comprises an upper portion 12, a lower portion 14, a dispenser 16, an electric cord 18. Electrical cord 18 may be of any design which is used to connect apparatus 10 with a source of electrical power.

Upper portion 12 contains means for extracting water from the air. Accordingly, upper portion 12 has an inlet 20 which may comprise a grill for allowing air to enter upper portion 12. Air may be introduced into inlet 20 by means of a fan. Preferably, the fan is provided downstream from the means for recovering water from the air so as not to be a source of contamination. Accordingly, the fan may be positioned adjacent to the air outlet 24.

The means for recovering water from air may comprise a chilled surface. For example, upper portion 12 may contain a refrigeration cycle whereby a compressible gas (eg. Freon) is passed through a continuous conduit which has a cold portion which the incoming air contacts causing water to condense thereon. This water may then be collected in a conduit.

Preferably, the means for recovering water from air comprises a recyclable desiccant. The desiccant may be a liquid such as an aqueous solution of lithium chloride and/or calcium chloride. Alternately, the desiccant may be a solid desiccant (eg. silica gel).

In operation, the desiccant is positioned in the air flow path of the air entering inlet 20. The desiccant may be operated on a batch cycle or on a continuous cycle. If it is operated on a batch cycle, then when the desiccant has adsorbed a predetermined amount of water from the air, the fan may be turned off and the desiccant treated to remove the water from the air. For example, the desiccant may be heated to cause the water to evolve. The evolved water may then be condensed and collected for treatment. If the desiccant is operated on a continuous cycle, then the desiccant may be circulated between a first zone in which the desiccant is exposed to the air entering inlet 20 (such as being sprayed there through) and circulated to a second zone wherein the absorbed water is extracted such as by heating. An example of this cycle is disclosed in co-pending application Ser. No. 09/188,349 which is incorporated herein by reference.

The collected water may then be passed through filter 26. Filter 26 is a mechanical filter to remove particulate matter that may become entrained in the water. For example, hairs and the like may enter inlet 20 with the air stream. The filtered water is then passed to a treatment zone 28 where it is exposed to a purification agent. The purification agent is preferable a non-chemical material. The purification agent may be applying ultraviolet radiation to the water or exposing the water to ozone. Most preferably, the water is exposed to ozone.

Lower portion 14 contains a reservoir 30 (see FIG. 1) for storing the treated water. The water may be treated as it passes through lower portion 14 to reservoir 30. Alternately, it may be treated in reservoir 30.

In the preferred embodiment of the instant invention, when the unit is started, means 22 is operated to extract water from the air. The water passes directly into reservoir 30. When a sufficient amount of water has entered reservoir 30, ozone is introduced into reservoir 30 (eg. by being bubbled therein through a sparger or the like). The water is treated for an amount of time sufficient to ensure that the water intake 30 is potable. When the user desires some water, they may activate a button of dispenser 16 which will cause the water to travel through conduit 32 which is in flow communication with dispenser 16.

If reservoir 30 is not completely filled when the water in 30 reservoir 30 is treated with ozone, then, as reservoir 30 continues to fill, the water therein may be periodically subjected to ozonation to treat all of the water which enters reservoir 30.

In accordance with one embodiment of this invention, the water (after passing through filter 26) is exposed to a medium to introduce a predetermined amount of salts and minerals therein. The salts and minerals which are introduced into the water are to provide an appropriate taste to the water. The medium may be placed at any position downstream of filter 26. In one embodiment, an access port (not shown) may be provided on lower portion 14 wherein a consumer may insert a housing containing the medium. The consumer may then easily replace the medium when it is consumed. Further, a number of different filter mediums may be provided so that the consumer can insert a housing having the desired composition to be dissolved in the water whereby the consumer may customize the water to their taste.

In accordance with another embodiment of the instant invention, the water is occasionally treated by the purification agent while in reservoir 30 so as to prevent the growth (or any regrowth) of biologic materials which may enter reservoir 30. Accordingly, on a periodic basis, the water in reservoir 30 may be ozonated so as to maintain the purification level of the water in reservoir 30. Accordingly, a consumer may have confidence that the water which is dispensed by dispenser 16 has been maintained in a purified state while in reservoir 30.

It will be appreciated that the water may be brought to any desired temperature (it may be chilled) so that it is dispensed at a pre-selected temperature. For example, reservoir 30 may be provided with cooling means (eg. a cooling coil located in reservoir 30 or an external cooling jacket) so as to maintain the water in reservoir 30 at a predetermined temperature.

It will be appreciated that the various modifications and changes may be made to apparatus 10 and all of these are within the scope of this invention.

What is claimed is:

1. A portable apparatus comprising:
   (a) a regenerable desiccant for treating air to obtain water and a reservoir for receiving the water;
   (b) an ozone generator for producing ozone and in flow communication with the reservoir whereby the water is treated to obtain purified water;
   (c) storage means for receiving the purified water;
   (d) means for intermittently purifying the water while in the storage means; and,
   (e) dispensing means.

2. The apparatus as claimed in claim 1 further comprising filter means for purifying the water.

3. The apparatus as claimed in claim 1 wherein the desiccant is a solid.

4. The apparatus as claimed in claim 1 further comprising refrigeration means for cooling the water.

5. The apparatus as claimed in claim 1 further comprising means for introducing minerals into the water.

6. The apparatus as claimed in claim 5 wherein the means for introducing minerals into the water comprises a removable cartridge.

7. A portable apparatus comprising:
   (a) a regenerable desiccant for treating air to obtain water and a reservoir for receiving the water;
   (b) an ozone generator for producing ozone and in flow communication with the reservoir whereby the water is treated to obtain purified water;
   (c) storage means for receiving the purified water;
   (d) means for introducing minerals into the water; and,
   (e) dispensing means.

8. The apparatus as claimed in claim 7 further comprising filter means for purifying the water.

9. The apparatus as claimed in claim 7 wherein the desiccant is a solid.

10. The apparatus as claimed in claim 7 further comprising refrigeration means for cooling the water.

11. The apparatus as claimed in claim 7 wherein the means for introducing minerals into the water comprises a removable cartridge.

* * * * *